United States Patent
Penke et al.

(10) Patent No.: US 10,574,807 B2
(45) Date of Patent: Feb. 25, 2020

(54) HYBRID SECONDARY SCREEN SMART COVER WITH E-INK

(71) Applicant: Samsung Electronics Co., Ltd., Suwon-si, Gyeonggi-do (KR)

(72) Inventors: Siva Penke, San Jose, CA (US); Siva Boggala, San Jose, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/796,371

(22) Filed: Jul. 10, 2015

(65) Prior Publication Data
US 2017/0013108 A1  Jan. 12, 2017

(51) Int. Cl.
*H04M 1/725* (2006.01)

(52) U.S. Cl.
CPC ... *H04M 1/72527* (2013.01); *H04M 1/72575* (2013.01); *H04M 2250/16* (2013.01)

(58) Field of Classification Search
CPC ............ H04M 1/72527; H04M 1/72575
See application file for complete search history.

(56) References Cited

U.S. PATENT DOCUMENTS

| | | | | |
|---|---|---|---|---|
| 5,930,026 A * | 7/1999 | Jacobson | ............... | B41J 3/4076 359/296 |
| 7,120,474 B1 * | 10/2006 | Sharp | ................... | H04M 1/0214 379/433.04 |
| 9,276,628 B1 * | 3/2016 | Zommer | ............... | H04B 1/3888 |
| 2010/0333006 A1 * | 12/2010 | Ostergard | ............ | G02B 26/005 715/768 |
| 2012/0194448 A1 | 8/2012 | Rothkopf | | |
| 2013/0088410 A1 * | 4/2013 | Hill | ........................ | G06F 3/1431 345/1.1 |
| 2014/0184471 A1 * | 7/2014 | Martynov | ............. | G06F 3/1423 345/1.2 |
| 2015/0062097 A1 * | 3/2015 | Chung | ................... | G06F 1/1626 345/184 |
| 2015/0198978 A1 * | 7/2015 | Catchpole | ............. | G06F 1/1632 345/173 |
| 2016/0103546 A1 * | 4/2016 | Hemminki | ............ | G06F 1/1643 345/173 |

FOREIGN PATENT DOCUMENTS

| | | |
|---|---|---|
| EP | 2426597 A1 | 7/2012 |
| EP | 2799950 A2 | 11/2014 |

OTHER PUBLICATIONS

LCD Vs E-Ink: Which Display on is Gentler on the Eyes Sarah Lewinsky, Jul. 29, 2015, Pick My Reader, available at https://pickmyreader.com/lcd-vs-e-ink-for-your-eyes/.*
Trademark Electronic Search System record for trademark serial No. 75364678 for the word mark "E Ink" filed by the E Ink corporation on Sep. 29, 1997.*
European Patent Office, "European Search Report," Application No. 16178741.1-1959, dated Dec. 8, 2016, 9 pages, publisher EPO, Munich, Germany, place of search The Hague.

* cited by examiner

Primary Examiner — Kwasi Karikari

(57) ABSTRACT

A device and apparatus is provided for a hybrid secondary screen smart cover with e-ink. The hybrid mobile device cover includes a first panel configured to connect to a mobile device. The hybrid mobile device cover also includes a second panel configured to cover a touchscreen of the mobile device. The second panel includes an e-ink display configured to display images in response to interactions with the touchscreen of the mobile device using an interface window.

19 Claims, 4 Drawing Sheets

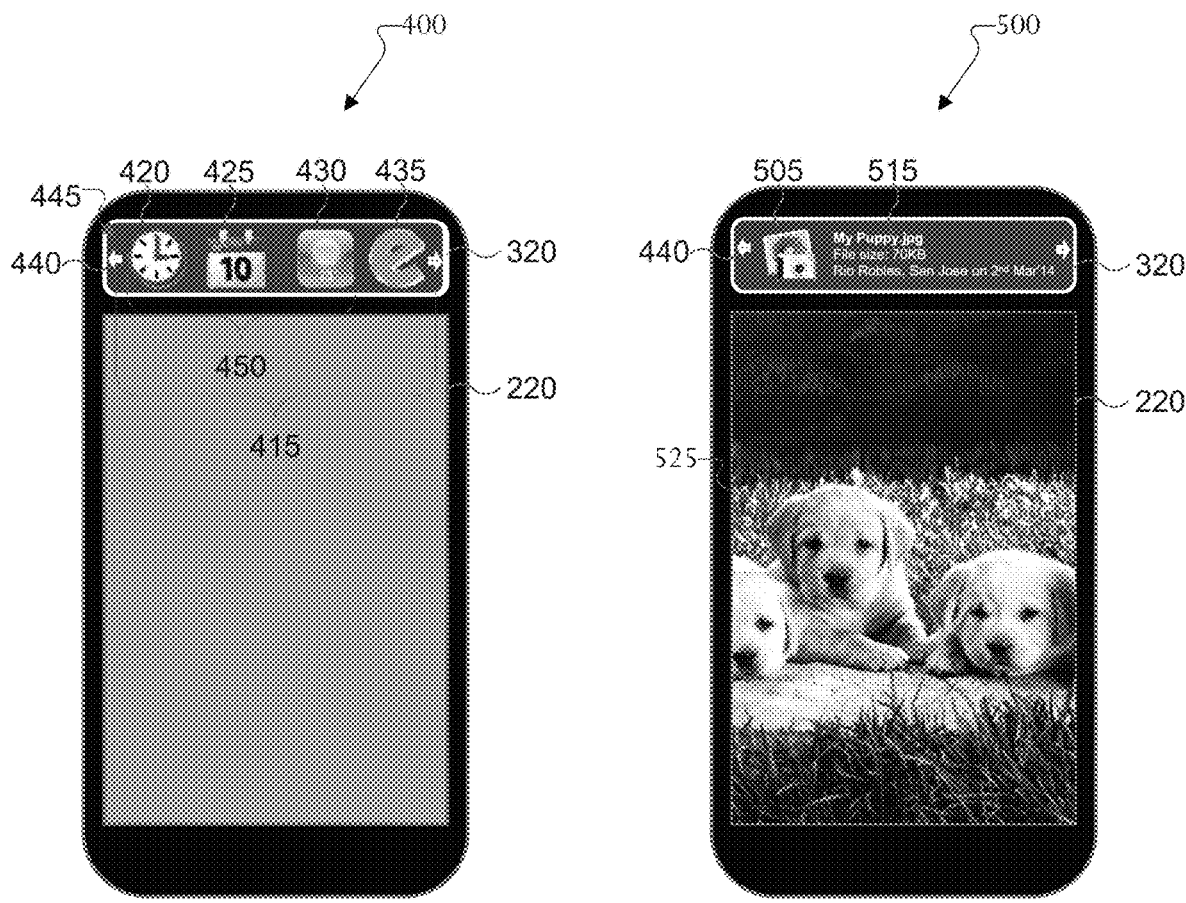
FIGURE 4
FIGURE 5
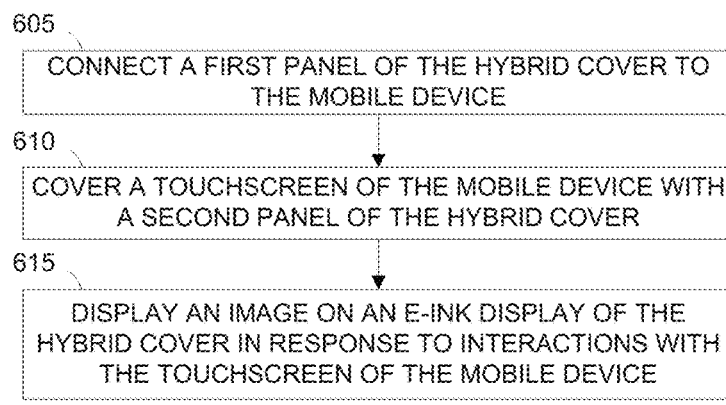
FIGURE 6

HYBRID SECONDARY SCREEN SMART COVER WITH E-INK

TECHNICAL FIELD

The present application relates generally to a cover attachable to a mobile device and, more specifically, to a hybrid secondary screen smart cover with an electrophoretic ink (e-ink) display.

BACKGROUND

Consumers desire longer battery lives of mobile devices. Certain applications on a mobile device consume more energy using the interface on the mobile device than required for the functions they provide.

SUMMARY

A first embodiment provides a hybrid mobile device cover. The hybrid mobile device cover includes a first panel configured to connect to a mobile device. The hybrid mobile device cover also includes a second panel configured to cover a touchscreen of the mobile device. The second panel includes an e-ink display configured to display images in response to interactions with the touchscreen of the mobile device using an interface window.

A second embodiment provides an apparatus for a secondary screen mobile device cover. The apparatus includes a mobile device and a hybrid mobile device cover. The hybrid mobile device cover includes a first panel configured to connect to a mobile device. The hybrid mobile device cover also includes a second panel configured to cover a touchscreen of the mobile device. The second panel includes an e-ink display configured to display images in response to interactions with the touchscreen of the mobile device using an interface window.

A third embodiment provides a method for controlling an e-ink display on a hybrid cover with a mobile device. The method includes connecting a first panel of the hybrid cover to the mobile device. The method also includes covering a touchscreen of the mobile device with a second panel of the hybrid cover. The method further includes displaying an image on an e-ink display of the hybrid cover in response to interactions with the touchscreen of the mobile device.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 4 illustrates a hybrid cover with an electrophoretic ink (e-ink) display according to this disclosure;

FIG. 5 illustrates a hybrid cover with an application running the e-ink display according to this disclosure; and FIG. 6 is a flow diagram illustrating a mobile device controlling an e-ink display located on a cover attached to the mobile device according to this disclosure.

DETAILED DESCRIPTION

FIGS. 1 through 6, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device.

Figure 1:
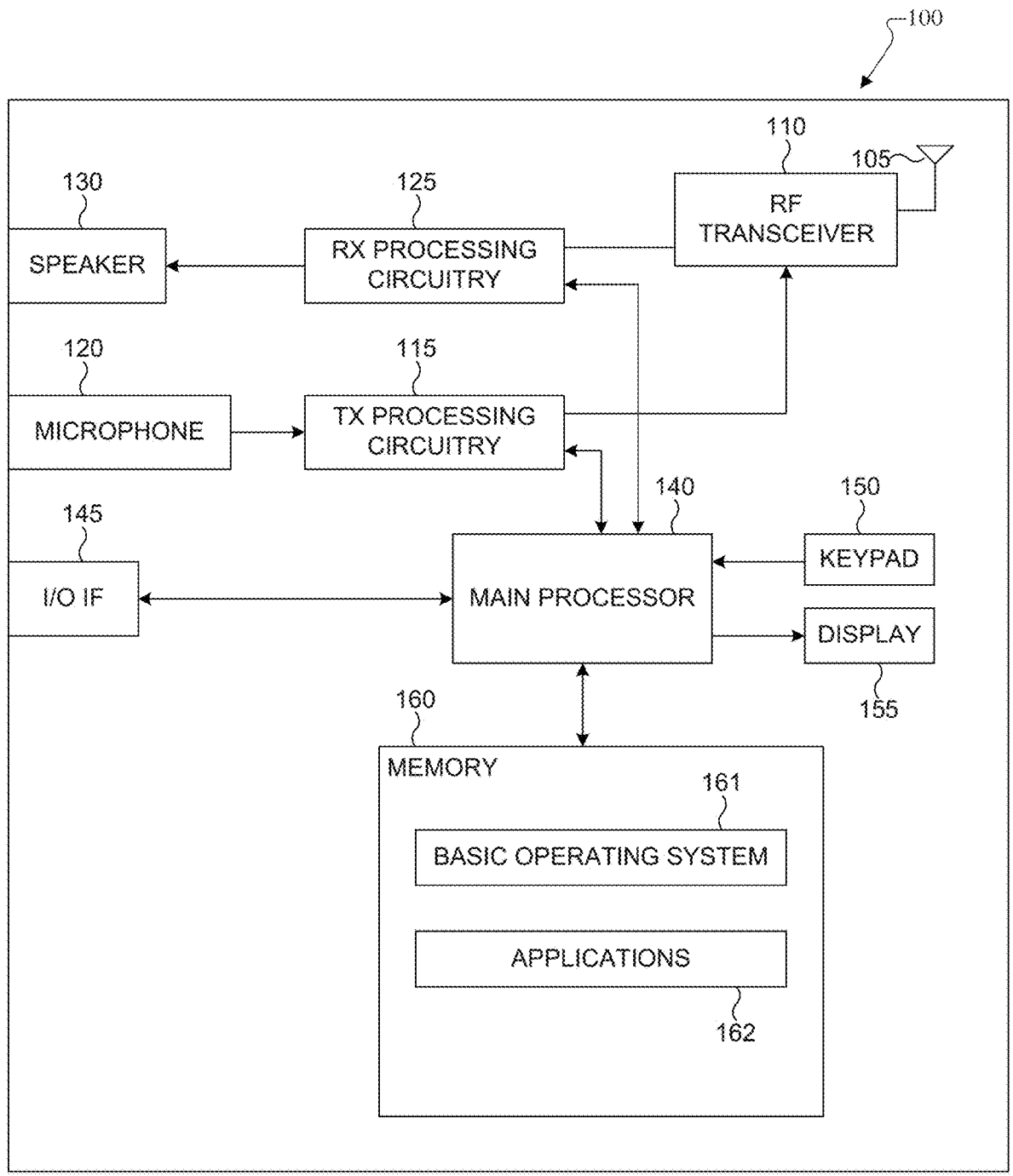
FIG. 1 illustrates an example mobile device according to this disclosure.

FIG. 1 illustrates an example mobile device 100 according to this disclosure.

As shown in FIG. 1, the mobile device 100 includes an antenna 105, a radio frequency (RF) transceiver 110, transmit (TX) processing circuitry 115, a microphone 120, and receive (RX) processing circuitry 125. The mobile device 100 also includes a speaker 130, a main processor 140, an input/output (I/O) interface (IF) 145, a keypad 150, a display 155, and a memory 160. The memory 160 includes a basic operating system (OS) program 161 and one or more applications 162.

The RF transceiver 110 receives, from the antenna 105, an incoming RF signal transmitted by another component in a system. The RF transceiver 110 down-converts the incoming RF signal to generate an intermediate frequency (IF) or baseband signal. The IF or baseband signal is sent to the RX processing circuitry 125, which generates a processed baseband signal by filtering, decoding, and/or digitizing the baseband or IF signal. The RX processing circuitry 125 transmits the processed baseband signal to the speaker 130 (such as for voice data) or to the main processor 140 for further processing (such as for web browsing data).

The TX processing circuitry 115 receives analog or digital voice data from the microphone 120 or other outgoing baseband data (such as web data, e-mail, or interactive video game data) from the main processor 140. The TX processing circuitry 115 encodes, multiplexes, and/or digitizes the outgoing baseband data to generate a processed baseband or IF signal. The RF transceiver 110 receives the outgoing processed baseband or IF signal from the TX processing circuitry 115 and up-converts the baseband or IF signal to an RF signal that is transmitted via the antenna 105.

The main processor 140 can include one or more processors or other processing devices and execute the basic OS program 161 stored in the memory 160 in order to control the overall operation of the mobile device 100. For example, the main processor 140 could control the reception of forward channel signals and the transmission of reverse channel signals by the RF transceiver 110, the RX processing circuitry 125, and the TX processing circuitry 115 in accordance with well-known principles. In some embodiments, the main processor 140 includes at least one microprocessor or microcontroller.

The main processor 140 is also capable of executing other processes and programs resident in the memory 160, such as operations for unlocking an electronic device with an authenticated wearable device. The main processor 140 can move data into or out of the memory 160 as required by an executing process. In some embodiments, the main processor 140 is configured to execute the applications 162 based on the OS program 161 or in response to signals received from external devices or an operator. The main processor 140 is also coupled to the I/O IF 145, which provides the mobile device 100 with the ability to connect to other devices such as laptop computers and handheld computers. The I/O IF 145 is the communication path between these accessories and the main controller 140.

The main processor 140 is also coupled to the keypad 150 and the display unit 155. The operator of the mobile device 100 can use the keypad 150 to enter data into the mobile device 100. The display 155 may be a liquid crystal display or other display capable of rendering text and/or at least limited graphics, such as from web sites.

The memory 160 is coupled to the main processor 140. Part of the memory 160 could include a random access memory (RAM), and another part of the memory 160 could include a Flash memory or other read-only memory (ROM).

Although FIG. 1 illustrates an example of a device in a computing system, various changes may be made to FIG. 1. For example, various components in FIG. 1 could be combined, further subdivided, or omitted and additional components could be added according to particular needs. As a particular example, the main processor 140 could be divided into multiple processors, such as one or more central processing units (CPUs) and one or more graphics processing units (GPUs). Also, while FIG. 1 illustrates the mobile device 100 configured as a mobile telephone or smartphone, mobile devices could be configured to operate as other types of mobile or stationary devices. In addition, as with computing and communication networks, mobile devices and servers can come in a wide variety of configurations, and FIG. 1 does not limit this disclosure to any particular mobile device or server.

Figure 2:
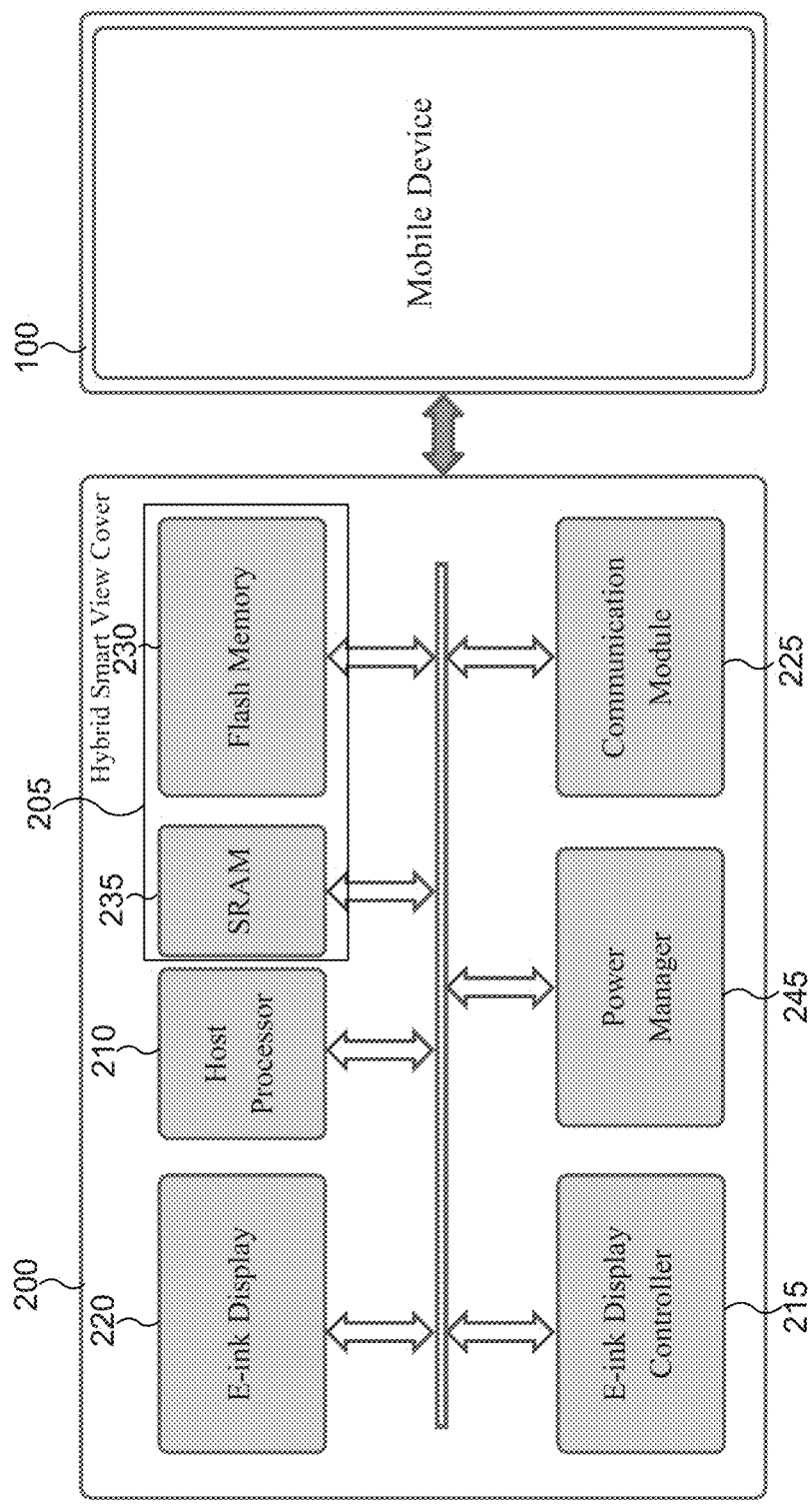
FIG. 2 illustrates electronic components found in the hybrid cover according to this disclosure.

FIG. 2 illustrates electronic components found in the hybrid cover 200 according to this disclosure. The embodiments shown in FIG. 2 are for illustration only. Other embodiments could be used without departing from the scope of the present disclosure.

As shown in FIG. 2, the hybrid cover 200 includes a memory 205, a host processor 210, an E-INK (herein after "e-ink") display controller 215, an e-ink display 220, a power manager 245, and a communications module 225. The memory 205 includes a flash memory 230 and a static random access memory (SRAM) 235.

The host processor 210 can include one or more processors or other processing devices and execute the basic e-ink display driver software stored in the memory 205 in order to control the overall operation of the hybrid cover 200, while power manager 245 manages the power requirements of the smart cover. In some embodiments, the host processor 210 includes at least one microprocessor or microcontroller.

The host processor 210 is also capable of executing other processes and programs, such as the e-ink display driver software, resident in the memory 205, such as the flash memory 230 or the SRAM 235. The host processor 210 can move data into or out of the memory 205 as required by an executing process. In some embodiments, the host processor 210 is configured to execute e-ink display driver software based on the OS program or in response to signals received from external devices, such as the mobile device 100, or an operator. The host processor 210 is also coupled to the communications module 225, which provides the hybrid cover 200 with the ability to connect to other devices such as laptop computers and handheld computers.

The host processor 210 is also coupled to the e-ink display 220. The e-ink display 220 may be a liquid crystal display or other display technologies capable of rendering text and/or at least limited graphics, such as from web sites.

The memory 205 comprises a flash memory 230 and a SRAM 235. The memory 205 is coupled to the host processor 210. Part of the memory 205 could include a random access memory (RAM), and another part of the memory 205 could include a read-only memory (ROM).

Although FIG. 2 illustrates an example of a device in a computing system, various changes may be made to FIG. 2. For example, various components in FIG. 2 could be combined, further subdivided, or omitted and additional components could be added according to particular needs. As a particular example, the host processor 210 could be divided into multiple processors, such as one or more central processing units (CPUs) and one or more graphics processing units (GPUs).

Figure 3:
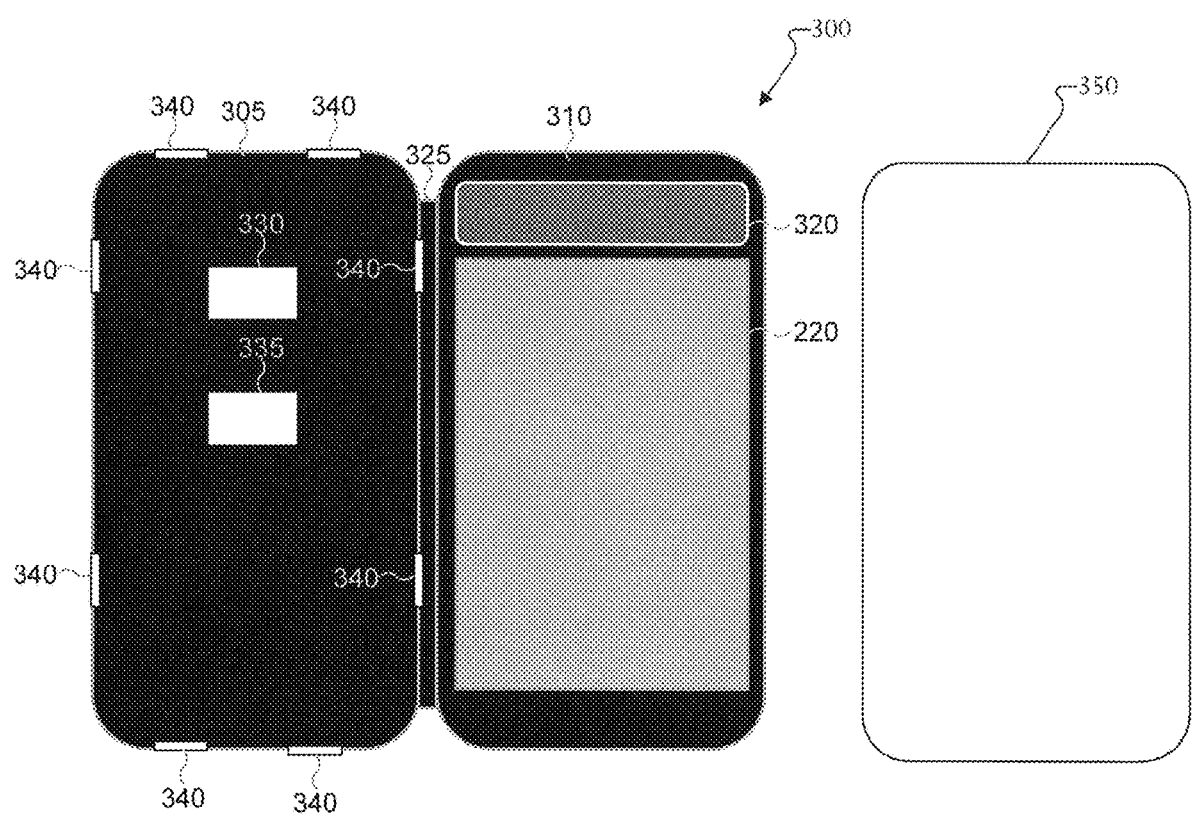
FIG. 3 illustrates a hybrid cover according to this disclosure.

FIG. 3 illustrates a hybrid cover 300 according to this disclosure. The embodiments shown in FIG. 3 are for illustration only. Other embodiments could be used without departing from the scope of the present disclosure.

The hybrid cover 300 includes a first panel 305, a second panel 310, an e-ink display 220, and an interface window 320.

The first panel 305 is used to secure the hybrid cover 300 to the mobile device 100. The first panel 305 connects to the outside of a mobile device 100 or replaces a portion of the mobile device's cover. In certain embodiments, the first panel 305 includes interface connections 330 for interfacing the communications module 225 with I/O IF 145 of the mobile device 100 and power connections 335 for charging the hybrid cover 300 from the mobile device 100. The first panel 305 also includes mechanical connections 340 for connecting the mobile device 100. The mechanical connections 340 are used to connect to a mobile device 100 with a back panel 350, such as a battery cover, removed.

The second panel 310 is used to cover the display of the mobile device 100. The second panel 310 connects to the first panel 305 with a flexible hinge 325. The second panel 310 includes an e-ink display 220 and an interface window 320. The second panel 310 is used to cover and protect a touchscreen 155 of the mobile device 100.

In the illustrated embodiment, the e-ink display 220 and the interface window 320 are located on the same side of the cover as the connections to the mobile device 100. While located on the same side of the hybrid cover 300, the e-ink display 220 is used as a secondary screen and the interface window 320 is a transparent window to allow interaction with the mobile device 100 for controlling the e-ink display 220. When the e-ink display 220 is used as a secondary display on the inside of the hybrid cover 300, the e-ink display 220 can extend across the entire second panel 310 and be controlled by the touchscreen 155 of the mobile device 100 without a separate interface window 320. In certain embodiments the e-ink display 220 and the interface window 320 are on an opposite side of the hybrid cover 300 compared to the connections. The interface window 320 is either a transparent window to allow interaction with the mobile device 100 to control the e-ink display 220 or is a dedicated display for controlling the e-ink display 220.

The e-ink display 220 is a low-power display that reflects light with or without a backlit panel. Another energy saving benefit of the e-ink display 220 is the display holds text or images indefinitely without electricity. The e-ink display 220 holds content for over 100 hours with consuming power. Power is only required to change or alter the contents displayed on the e-ink display 220. The e-ink display 220 can be located on either side of the second panel 220 or on the side of the first panel 305 opposite of the connections. The hybrid cover 300 can include multiple e-ink displays 220.

The interface window 320 controls the applications 162 displaying text and images on the e-ink display 220. The interface window 320 can be a dedicated display interface or a transparent window that allows the user to interact with an interactive portion of the mobile device located beneath the interface window 320. Using the touchscreen 155 of the mobile device 100 reduces the costs of the e-ink display 220 and the extra power consumption required for an e-ink touch screen. Although the requiring a greater power consumption, the e-ink display 220 could also have touch functionality.

FIG. 4 illustrates a hybrid cover 400 with an e-ink display 220 according to this disclosure. The embodiments shown in FIGS. 4 are for illustration only. Other embodiments could be used without departing from the scope of the present disclosure.

As depicted in FIG. 4, the interface window 320 display a number of compatible applications 415 representing applications 162 that are compatible with the e-ink display 220, such as a clock application 420, a calendar application 425, a weather application 430, and other applications 435. The default applications 450 on the main application page 445 can be set by the user. Selecting the other applications 430 opens up the list of other compatible applications 415 loaded on the mobile device 100 that are compatible with the e-ink display 220. When there are more compatible applications 415 than what can fit in the interface window 320, arrows 440 are provided to scroll through different application pages 445. While the hybrid cover 400 is connected to the mobile device 100 and the second panel 310 is covering the touchscreen 155 of the mobile device 100, the touchscreen 155 of the mobile device 100 is turned off except for the portion directly under the interface window 320, or other interaction portion, reducing the power consumed.

FIG. 5 illustrates a hybrid cover 500 with an application 505 running the e-ink display 220 according to this disclosure. The embodiments shown in FIGS. 5 are for illustration only. Other embodiments could be used without departing from the scope of the present disclosure.

Once an application icon 505 is chosen from the interface window 320, descriptive text 515 is also displayed in the interface window 320. The application 162 transmits information to the host processor 210 through the communication module 225. The host processor 210 causes the e-ink display controller 215 to produce text or images 525 from the application 162 on the e-ink display 220. The application 162 controlled through the interface window 320 through arrows 440 or swiping motions. Examples of different applications 162 for the e-ink display 220 include, but are not limited to, task or shopping lists applications, exercise applications, picture gallery, or different e-reading applications. Any physical buttons located on the mobile device 100 can also be used to control the e-ink display 220.

FIG. 6 is a flow diagram illustrating a mobile device 100 controlling an e-ink display 220 located on a hybrid cover 300 attached to the mobile device 100 according to this disclosure. While the flow chart depicts a series of steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by processing circuitry in, for example, an electronic device, such as the host processor 210.

In operation 605, the first panel 305 of the hybrid cover 300 connects to the mobile device 100. The first panel 305 can fit around the outside of the mobile device 100 or replace a panel of the mobile device 100. When the panel of the mobile device 100 is removed, the first panel 305 mechanically connects to the mobile device 100 using mechanical connections 340 that are the same as the connection from the removed panel. The removed panel of the mobile device 100 exposes I/O IF 145 that connect to the interface connections 330 used to communicate with the mobile device 100 and the power connections 335 used to charge the hybrid cover 300.

In operation 610, the second panel 310 of the hybrid cover 300 covers the touchscreen 155 of the mobile device 100. The hybrid cover 300 communicates with the mobile device 100 to deactivate the touchscreen 155 except for an interaction portion covered by the interface window 320. The hybrid cover 300 controls the mobile device 100 to display applications 162 that are compatible with the e-ink display 220. The user can navigate through different compatible applications 415 and control features of a selected compatible application 415 using swipes in the interface window 320.

In operation 615, the e-ink display 220 displays an image 525 in response to selections from a user of the compatible applications 415 from the interface window 320 on the mobile device 100. When a compatible application 415 is selected, the mobile device 100 sends the data to the hybrid cover 300 to display an image 525.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A mobile device cover comprising:
a first panel configured to connect to a mobile device; and
a second panel configured to cover a touchscreen display of the mobile device, the second panel comprising:

an interface window; and a secondary display configured to be controlled by the touchscreen display of the mobile device through an interaction portion of the touchscreen display of the mobile device, wherein the interface window is configured to enable access to the interaction portion of the touchscreen display of the mobile device when the second panel covers the touchscreen display of the mobile device, wherein the secondary display is configured to vary images displayed in response to interactions with the interaction portion of the touchscreen display of the mobile device using the interface window, and wherein the secondary display is configured to display images without being backlit and configured to use power to change or alter such images without using additional power to hold display of such images.

2. The mobile device cover as set forth in claim 1, wherein the first panel is configured to couple to a rear portion of the mobile device, and wherein the rear portion is where a back panel of the mobile device was previously located.

3. The mobile device cover as set forth in claim 1, wherein the first panel includes power and communications connections to interact with the mobile device.

4. The mobile device cover as set forth in claim 1, wherein the interface window is configured to allow a user to view and interact with the interaction portion of the touchscreen display of the mobile device while the secondary display covers the touchscreen display of the mobile device.

5. The mobile device cover as set forth in claim 4, wherein in response to the second panel covering the touchscreen display of the mobile device, the touchscreen display of the mobile device turns off except for the interaction portion of the touchscreen display of the mobile device.

6. The mobile device cover as set forth in claim 5, wherein said interaction portion comprises icons that represent applications compatible with the secondary display.

7. The mobile device cover as set forth in claim 1, further comprising a second secondary display to interact with the mobile device when the second panel is not covering the touchscreen display of the mobile device.

8. An apparatus comprising:
a mobile device comprising a touchscreen display; and
a mobile device cover comprising:
a first panel configured to connect to the mobile device; and
a second panel configured to cover the touchscreen display, the second panel comprising:
an interface window, and
a secondary display,
wherein the secondary display is configured to be controlled by the touchscreen display of the mobile device through an interaction portion of the touchscreen display of the mobile device,
wherein the interface window is configured to enable access to the interaction portion of the touchscreen display when the second panel covers the touchscreen display,
wherein, in response to interactions with the touchscreen display of the mobile device through the interface window, images are varied in the interaction portion of the touchscreen display and the secondary display, and
wherein the secondary display is configured to display images without being backlit and configured to use power to change or alter such images without using additional power to hold display of such images.

9. The apparatus as set forth in claim 8, wherein the first panel is configured to couple to a rear portion of the mobile device, and wherein the rear portion is where a back panel of the mobile device was previously located.

10. The apparatus as set forth in claim 8, wherein the first panel includes power and communications connections to interact with the mobile device.

11. The apparatus as set forth in claim 8, wherein the interface window is configured to allow a user to view and interact with the interaction portion of the touchscreen display of the mobile device while the secondary display covers the touchscreen display of the mobile device.

12. The apparatus as set forth in claim 11, wherein when said second panel covers the touchscreen display of the mobile device, the second panel causes the mobile device cover to control the mobile device to turn the touchscreen display off except for the interaction portion covered by the interface window.

13. The apparatus as set forth in claim 12, wherein said interaction portion comprises icons that represent applications compatible with the secondary display.

14. The apparatus as set forth in claim 8, further comprising a second secondary display to interact with the mobile device when the second panel is not covering the touchscreen display of the mobile device.

15. A method for controlling a secondary display on a cover with a mobile device, the method comprising:
covering a touchscreen display of the mobile device with a second panel of the cover, the second panel having an interface window to enable inputs to an interaction portion of the touchscreen display; and
in response to interactions with the touchscreen display of the mobile device, displaying first image on the secondary display of the cover and varying a second image displayed on the touchscreen display, wherein the interface window and the interaction portion are a dedicated display interface area for the secondary display, wherein the secondary display is configured to display images without being backlit and configured use power to change or alter such images without using additional power to hold display of such images.

16. The method as set forth in claim 15, further comprising coupling a first panel of the cover to the mobile device, wherein the first panel is coupled to a portion of the mobile device that was previously coupled to a back panel of the mobile device.

17. The method as set forth in claim 16, wherein the first panel includes power and communications connections to interact with the mobile device.

18. The method as set forth in claim 15, wherein covering the touchscreen display of the mobile device with the second panel causes the cover to control the mobile device to turn the touchscreen display off except for the interaction portion covered by the interface window.

19. The method as set forth in claim 18, wherein said interaction portion comprises icons that represent applications compatible with the secondary display.

\* \* \* \* \*